April 7, 1936.  W. T. BACKUS  2,036,560
LAND VEHICLE EQUIPMENT
Filed Dec. 10, 1934  3 Sheets-Sheet 1
FIG. I.
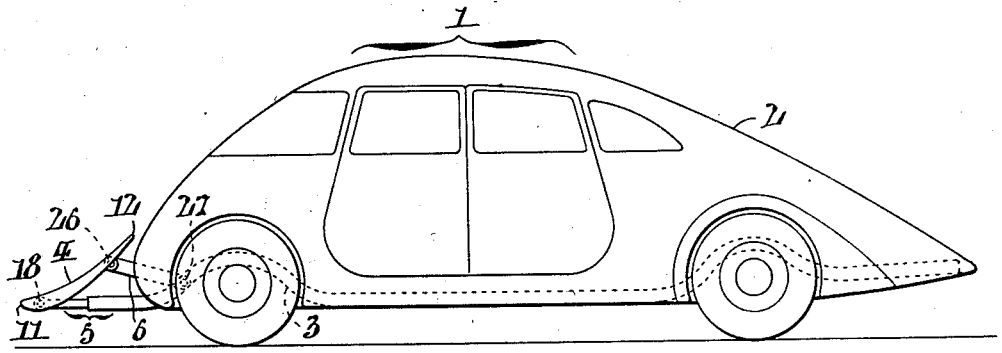
FIG. II.
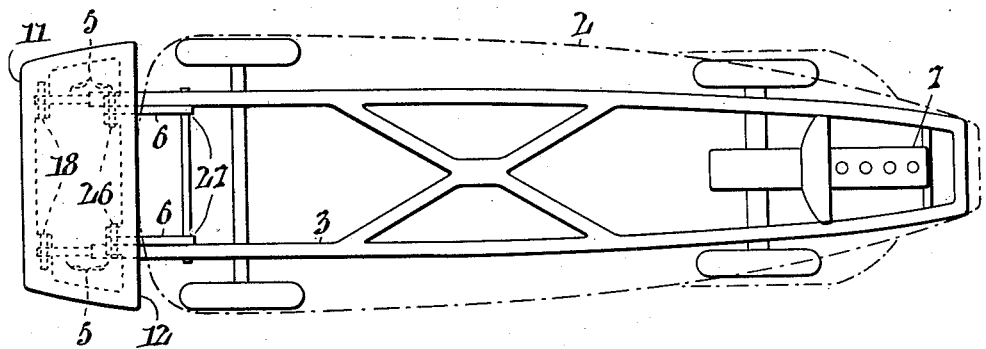
FIG. III.
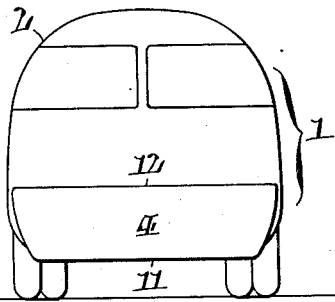
WITNESSES:
INVENTOR:
Wallace T. Backus,
BY
ATTORNEYS.

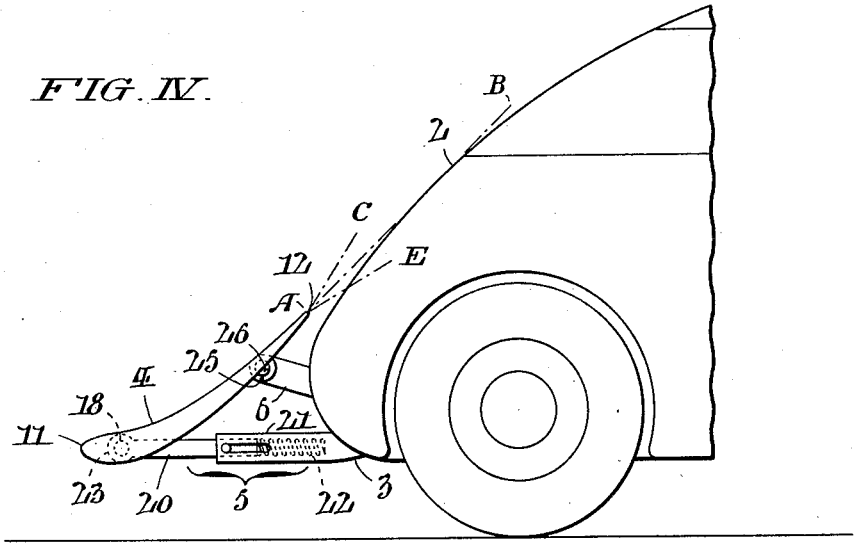
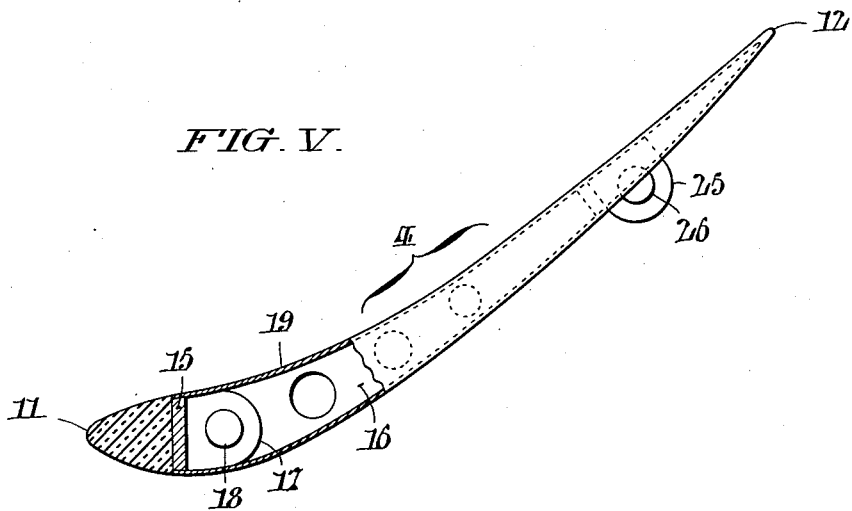

April 7, 1936.  W. T. BACKUS  2,036,560
LAND VEHICLE EQUIPMENT
Filed Dec. 10, 1934   3 Sheets-Sheet 3
FIG. VI.
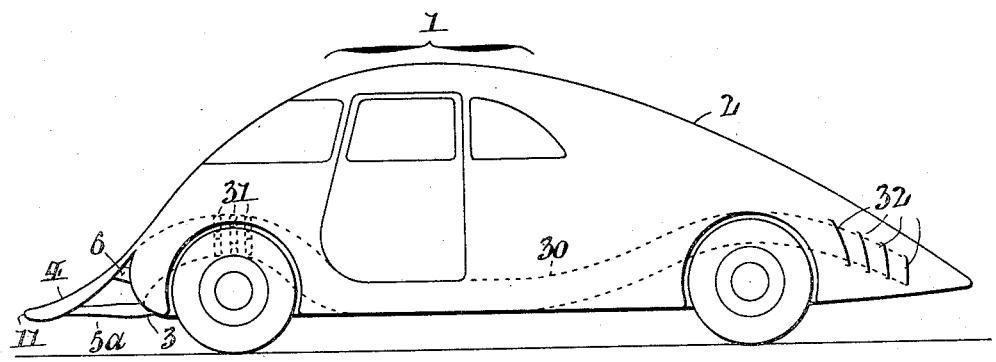
WITNESSES:
Thomas W. Kerr
John A. Weidler
INVENTOR:
Wallace T. Backus,
BY Fraley Paul
ATTORNEYS.

Patented Apr. 7, 1936

2,036,560

UNITED STATES PATENT OFFICE 2,036,560

LAND VEHICLE EQUIPMENT

Wallace T. Backus, Philadelphia, Pa.

Application December 10, 1934, Serial No. 756,732

12 Claims. (Cl. 296—1)

This invention relates generally to land vehicle equipment and more particularly to air foils for such vehicles.

In an effort to reduce the loss of efficiency from wind resistance, stream-lining has come rapidly to the front as is evidenced in the present developments of design in automobiles and railway trains. While the top and side surfaces have been the subject of much stream-lining, the under surfaces of the vehicles have not been so improved. This lack of stream-lining on the under surfaces of vehicles is doubtless due to the numerous projections on the bottoms of vehicles which cannot be easily avoided. Nevertheless this under surface is the source of even more loss of efficiency than results from unimproved upper surfaces of the same vehicle. This is so for two reasons. First, the numerous projections on the bottoms of vehicles increase the amount of wind resistance; and, second, the air pressure which is built up underneath the moving car in the restricted space between the bottom surface of the vehicle and the ground increase the amount of drag or retardation from wind resistance. The degree of drag due to wind resistance varies directly with the increase of density of the air which in turn varies directly with the air pressure. Accordingly, one object of this invention is the provision of an apparatus which will lower the air pressure underneath a moving vehicle thereby reducing the degree of drag from the unstream-lined underside.

With the present development of stream-lining, there has arisen a disposition on the part of automobile designers to place the engine in the rear instead of in the front of the automobile. The pure stream-lined body invites the utilization of the restricted space in the rear of the body by placing the engine there. Such a heavy weight in the rear of an automobile demands a strong counterbalancing force on the front of the automobile. With a stream-lined body it is particularly important to guard against the recognized tendency of the front end of the vehicle to rise; and when a heavy weight is placed in the rear of a streamlined body, this tendency becomes a positive menace which cannot be passed over lightly. The profile of stream-lined land vehicle bodies is similar to the air foil and naturally exhibits the lifting characteristics of the latter. Hence another object of this invention is the provision of an apparatus which will exert a downward force at the front of a vehicle in order to keep the front wheels positively on the ground.

Another object of this invention is the provision of an apparatus of the above character in which the deflected wind from the underside flows to the stream-lined upper surfaces of the vehicle thereby reducing drag.

Another object of this invention is the provision of an apparatus of the above character in which the deflected air is utilized as an air current in the vehicle without undue drag. For example, the air current would cool cooling coils or a radiator or the engine, or it could be utilized for ventilation.

Another object of this invention is the provision of an apparatus of the above character which is adapted to serve as a bumper.

Other objects and advantages of the invention will be apparent from the detailed description of a preferred embodiment thereof which follows and which has reference to the accompanying drawings. Of the drawings:

Fig. I shows a side view of an automobile having a stream-lined body with an inverted air foil mounted at the front thereof.

Fig. II shows a plan view of an automobile with the body removed to show the mounting of the air foil.

Fig. III is a front view of a stream-lined automobile equipped with an inverted air foil at the front end thereof.

Fig. IV is a partial side view of the front end of an automobile equipped with my invention, showing the mounting of the inverted air foil in detail.

Fig. V is a side view, partially in section, of the air foil used in the preferred form of my invention.

Fig. VI is a side view of a stream-lined automobile equipped with a modified form of my invention in which the trailing edge of the inverted air foil merges into the automobile body.

The preferred embodiment of my invention comprises generally an automobile 1 having a stream-lined body 2 and frame 3 on which an inverted air foil 4 is securely mounted by means of shock absorbing members 5 and supporting arms 6.

The automobile 1 represents conventionally a modern type of stream-lined automobile having an engine 7 placed in the rear. The stream-lined body 2 is of the tear drop type and shows streamlining to an advanced degree. From the side view the similarity of this type of body to the cross section of an air foil clearly appears. The tendency of the front end of stream-lined automobiles to rise is thus inherent in its form and is a definite problem.

The air foil 4, having a leading edge 11 and a trailing edge 12, need be of no particular type; but its characteristics determine its suitability for the requirements of the vehicle in question. The number of air foil sections which have at some time been tested in wind tunnels and their characteristics recorded, is very large and the field of selection is broad. Of the numerous compilations of air foil data that have been made, the most complete which is kept up to date by the periodic issuance of new data includes well over 600 sections. ("Aerodynamic Characteristics of Airfoils", published in the reports of National Advisory Committee for Aeronautics.) The selection of an air foil section for the purposes of my invention is largely a matter of engineering choice after considering the tabulated characteristics of the lists of air foil sections just mentioned.

The section used in my preferred embodiment was selected from the official publication entitled N. A. C. A. Technical Reports 1930, Sixteenth Annual Report, in which this air foil section is shown on page 448, Fig. 90, and designated R. A. F. 19. The characteristics of lift and drag of this section are highly suitable to my invention, and the table of coordinates in percentage of length of section by which the section may be constructed is set out below as it appears in the above publication.

| Percent | Upper | Lower |
|---|---|---|
| 0 | 1.20 | 1.20 |
| 1.25 | 3.90 | 3.90 |
| 2.5 | 5.80 | 0.00 |
| 5.0 | 8.50 | 0.10 |
| 7.5 | 10.40 | 0.60 |
| 10. | 11.80 | 1.40 |
| 15. | 13.70 | 3.20 |
| 20. | 14.70 | 4.90 |
| 30. | 15.20 | 6.90 |
| 40. | 14.70 | 7.50 |
| 50. | 13.40 | 7.20 |
| 60. | 11.70 | 6.20 |
| 70. | 9.50 | 5.00 |
| 80. | 7.10 | 3.40 |
| 90. | 4.30 | 1.70 |
| 95. | 2.60 | 0.80 |
| 100. | 0.60 | 0.60 |

The angle of maximum lift is 16° for this section and hence the angle at which the inverted air foil is mounted on the automobile is fixed accordingly at an angle slightly less than 16°, in order to have a more stable working angle.

In the preferred embodiment a relatively high camber section is shown in Fig. V. It is hollow, with internal reinforcement by the usual spar and rib construction, and may be made from any strong durable metal which will stand the rough usage to be expected on an automobile. The length or span of the air foil 4 is substantially the width of the car, and the width of the air foil is determined by the effective area desired. The air foil area in turn is determined by the considerations of drag and lift which are readily determined from the tabulated characteristics of the particular air foil section adopted. The technical "lift", it is to be noted, will be exerted downward in my invention because the air foil 4 is installed in an inverted position.

The desired amount of downward pressure from the technical "lift" of the air foil 4 is arrived at by careful judgment from a consideration of the design of the vehicle in question. Thus, in the preferred embodiment I have shown conventionally an automobile having its engine in the rear. This heavy weight and the moments involved is an important consideration in determining the amount of downward force needed at the front of the car. Consequently, I have chosen the angle of maximum lift and an area sufficient to produce a downward force greatly in excess of the forces tending to lift the front end of this automobile. Where the downward force at the front of the car is but a nominal consideration, the element of drag becomes of primary importance, because in that case the object is to deflect the air current from building up pressure under the vehicle with a minimum retardation. The same considerations of course determine the angle of attack for which the air foil 4 is to be adjusted when in place on the front of the automobile.

The air foil 4 is constructed after the fashion of the metallic wing structures now used on airplanes in which spars and ribs make up the framework over which the metallic covering is fitted, and is built on a strong metal spar 15 and metal ribs 16, to which brackets 17 are welded. These brackets 17 are fitted with spindles 18 to which the shock absorbing members 5 are pivotally connected. The leading edge 11 of the air foil 4 is formed of rubber having a high resiliency, and it is fastened by a bonding process to the spar 15. Naturally, any other strong resilient material could be substituted for rubber. This provides a serviceable buffer which avoids deformation or injury to the leading edge of the air foil 4 when functioning as a bumper. A covering 19 of a light but strong sheet metal is fastened to the spar 15 and ribs 16 as in the metal wing structure now being used on airplanes. For the support of the rear and upper portion of the air foil 4 brackets 25 with spindles 26 are attached to ribs 16 by welding.

The shock absorbing element 5 is of the usual type having a plunger 20 operating in a cylinder 21 in which a heavy coil spring 22 is housed. The cylinder 21 is formed integrally with the frame 3, though it could be bolted or shackled thereto as in the case of applying my invention to a car not originally equipped with it. The forward end of the plunger 20 is formed with a bearing 23, to receive the pivot 18.

The rear and upper portion of the air foil 4 is supported by the two arms 6. Each arm 6 has a bearing 25 at one end to receive one of the spindles 26 and is pivotally attached at the other end to the frame 3 at 27. The length of the arms 6 is determined by the angle at which the air foil 4 is to be set. The distance in front of the body 2 at which the air foil 4 is mounted is determined by the stream-line relation between the air foil 4 and the body 2. The air current leaving the trailing edge 12 of the air foil 4 should flow easily onto the body 2 along a substantially stream-line course. This relationship is effected by so placing the air foil 4 in regard to the front of the automobile that the bisectrix A—B of the trailing edge angle CAE lies substantially tangent to the surface of the body at B as shown in Fig. IV. This insures an easy flow of air from the air foil 4 to the body 2 along a stream-line course of the tangent AB so that the wind current from the trailing edge 12 of the air foil 4 causes as little retardation as possible. This harmonious stream-line relationship between the air foil 4 and the front of the body 2 might be further improved by forming the air foil 4 with a curve in the direction of its length to conform to the rounded front of the body 2, but I have not seen fit to employ this refinement in the preferred embodiment of my invention. Without departing from the spirit of my invention, the trailing edge 12 may also be continued and merged structurally into the surface of the front end of the body 2 preserving the stream-line relationship of air foil 4 to body 2, and leading the air current from the under surface of the air foil 4 off through wind ducts. This modification of my invention is illustrated in Fig. VI and described in more detail below. The air current from the underside of the air foil 4 might further be utilized in the body 2 for cooling or ventilating purposes.

The modified form of my invention is similar to the preferred form described above except that the air foil 4 is joined integrally at its trailing edge 12 to the body 1, the stream-line relation being preserved. In the modified form the wind current from the underside of the air foil 4 is led off through a wind duct 30 which may be made of any light material customarily used for wind ducts. I suggest the use of some light metal such as aluminum. The wind duct 30 is installed in the automobile as indicated by the dotted lines in Fig. VI. It must, of course, clear the axles and the lower edge of the door. The front end of the wind duct 30 follows an easy upward curve in continuation of the under surface of the air foil 4. In this modified form there is no shock-absorbing element 5 and in its stead is a supporting arm 5a which is integral with the frame 3 like the shock absorbing element 5 in the preferred form. The arms 6 further brace the air foil 4 as in the preferred form and the construction of the air foil 4 is the same. The wind current in the wind duct 30 may be utilized for ventilation, cooling and similar purposes in the automobile. I suggest the installation of radiator cooling coils diagrammatically indicated at 31 in the wind duct 30 making an efficient cooling unit by using this wind current. The wind is discharged at the end of the wind duct 30 through a number of discharge openings 32 disposed along the sharply converging tail portion of the body 1. In other respects, the construction of the air foil 4 in the modified form and the manner in which it is secured to its supporting arms 5a and 6 is similar to the preferred form as described in detail above.

The operation of my invention has been indicated in connection with the description of the structure above, and need not be enlarged upon further. It is clear that my invention provides a simple and inexpensive way of solving a problem of stream-lining which has been a recognized obstacle in the development of this field by effectually reducing retardation from wind resistance on the underside of vehicles and at the same time holding the front end of stream-lined vehicles to the ground.

While my invention has been described in some detail with reference to a specific embodiment, various changes in the form of apparatus used are within the contemplation of the invention, and such changes should not be deemed to constitute a departure from the spirit of the invention as hereinafter claimed.

Having thus described my invention, I claim:

1. In combination with a land vehicle an inverted air foil having a substantially non-convex upper surface, and attached at one end of the vehicle to function as an air foil and so that the resultant of the aerodynamic forces on the air foil surface due to motion of the vehicle is downward, said air foil extending substantially across the end of said vehicle.

2. In combination with a land vehicle an inverted air foil having a non-convex upper surface, and attached at the front end of the vehicle to function as an air foil and so that the cambers of the upper and lower surfaces of the air foil deflect air away from the underside of the vehicle, said air foil extending substantially across said front end.

3. The combination according to claim 1 characterized by the further fact that the air foil is attached to the front end of the vehicle and deflected air leaving the air foil is directed to the vehicle to be utilized as an air current or draft.

4. In combination with a land vehicle equipped with cooling means, an inverted air foil having a non-convex upper surface, and attached to and extending substantially across the front end of the vehicle to function as an air foil and so that the cambers of the upper and lower surfaces of the air foil deflect air away from the underside and on to said cooling means.

5. In combination with a land vehicle, a bumper extending substantially across the front end of the vehicle and having an air foil cross section whose upper camber is non-convex, the bumper being attached to the vehicle to function as an air foil and so that the resultant of the aerodynamic forces on the air foil surfaces due to motion of the vehicle is downward.

6. In combination with a stream-lined land vehicle an inverted air foil having a non-convex upper surface, and attached at the front end of the vehicle to function as an air foil and so that the plane bisecting the angle of the planes of the trailing edge lies substantially tangent to the surface of said vehicle whereby the flow from the air foil to the vehicle substantially stream-lines into the stream-lining of the vehicle, said air foil extending substantially across the front end of the vehicle.

7. In combination with a stream-lined land vehicle having a ventilator in the front end, an inverted air foil having a non-convex upper surface, and attached at one end of the vehicle to function as an air foil, the after edge of the air foil being attached to the body of the vehicle in stream-line relation to the stream-lining of the body, the wind from the under surface of the air foil being deflected into the vehicle through said ventilator, said air foil extending substantially across said vehicle.

8. In combination with a land vehicle a shock absorbing element mounted on the front of the vehicle, and an inverted air foil having a non-convex upper surface, and attached to said shock absorbing element to function as an air foil, said air foil extending substantially across the front end of the vehicle.

9. The combination according to claim 8 characterized by the further fact that the air foil is pivotally attached to said shock absorbing element and an arm supports the upper portion of said air foil in a raised position, said arm being pivotally attached both to the air foil and to the vehicle.

10. The combination according to claim 8, characterized by the further fact that the leading edge of said air foil is formed of a resilient material secured to the air foil.

11. The combination according to claim 6 characterized by the further fact that the trailing edge of the air foil is attached to the surface of said vehicle in stream-lined relation, and a wind duct attached to the vehicle leads the air current from the under surface of the vehicle rearward.

12. The combination according to claim 6 characterized by the further fact that the trailing edge of the air foil is attached to the surface of said vehicle in stream-lined relation, that a wind duct attached to the vehicle leads the air current from the under surface of the vehicle rearward, and that radiator cooling means are installed in said wind duct to be cooled by the wind current.

WALLACE T. BACKUS.